United States Patent [19]

Mihara

[11] Patent Number: 4,749,267
[45] Date of Patent: Jun. 7, 1988

[54] LARGE APERTURE RATIO ZOOM LENS SYSTEM

[75] Inventor: Shin-ichi Mihara, Tokyo, Japan

[73] Assignee: Olympus Optical Co., Ltd., Tokyo, Japan

[21] Appl. No.: 748,396

[22] Filed: Jun. 24, 1985

[30] Foreign Application Priority Data

Jun. 27, 1984 [JP] Japan .................. 59-130897

[51] Int. Cl.$^4$ .............................................. G02B 15/00
[52] U.S. Cl. ...................... 350/427; 350/423; 350/432
[58] Field of Search .................. 350/427, 432, 423

[56] References Cited

U.S. PATENT DOCUMENTS 4,281,906  8/1981  Tanaka ........................ 350/427
4,416,518  11/1983  Hugues et al. ............... 350/427
4,572,620  2/1986  Kikuchi ....................... 350/432

FOREIGN PATENT DOCUMENTS 48-32387  10/1973  Japan .

*Primary Examiner*—John K. Corbin
*Assistant Examiner*—P. Dzierzynski
*Attorney, Agent, or Firm*—Cushman, Darby & Cushman

[57] ABSTRACT

A large aperture ratio zoom lens system comprising a first lens group having positive refractive power, a second lens group having negative refractive power, a third lens group having negative refractive power, and a fourth lens group comprising a front subgroup and a rear subgroup wherein the front subgroup comprises at least one negative lens component and the rear subgroup comprises at least one positive lens component, the large aperture ratio zoom lens system having at least one aspherical surface in the front subgroup, having a short overall length, a long back focal length, high resolving power and high performance, and being capable of coping with the use with an electronic image pick-up device.

9 Claims, 11 Drawing Sheets

LARGE APERTURE RATIO ZOOM LENS SYSTEM

BACKGROUND OF THE INVENTION (a) Field of the Invention

The present invention relates to a large aperture ratio zoom lens system and, more particularly, to a large aperture ratio zoom lens system in which at least one of lens surfaces in formed as an aspherical surface and which is arranged to comprise a small number of lenses.

(b) Description of the Prior Art

Most of known zoom lens systems for electronic photographing cameras adopting image pick-up tubes or solid-state image pick-up devices generally have aperture ratios of F/2.0 and over and zoom ratios of 3 and over. However, the above-mentioned kind of zoom lens systems comprise large numbers of lens elements. For example, the zoom lens systems according to the U.S. patent application No. 706,863 (Japanese patent application Nos. 38649/84 and 41974/84) invented by the same inventor as the present invention comprises thirteen or fourteen lens elements. The above-mentioned zoom lens system is designed so as to have high performance by expecting that the performances of image pick-up devices will become higher. Moreover, when the technology for the manufacture of aspherical lenses progresses in future so that aspherical lenses can be obtained at low costs, it will be possible to obtain a zoom lens system having a performance equivalent to or higher than that of the zoom lens system according to the above-mentioned invention (U.S. patent application No. 706,863) but comprising a smaller number of lens elements. In other words, it will be possibe to obtain a zoom lens system with a performance higher than that of the zoom lens system accoridng to said invention at a lower cost.

SUMMARY OF THE INVENTION

It is, therefore, a primary object of the present invention to provide a large aperture ratio zoom lens system with a field angle of 15° to 45°, zoom ratio of 3 and F number of F/2.0 class, said large aperture ratio zoom lens system being arranged that at least one of lens surfaces in the lens system is formed as an aspherical surface and being thereby arranged to have a short overall length, a long back focal length and high performance and, at the same time, to comprise a small number of lenses.

The large aperture ratio zoom lens system according to the present invention comprises, in the order from the object side, a first lens group having positive refractive power and arranged as a focusing lens group which is kept fixed at the time of zooming and is movable only at the time of focusing, a second lens group having negative refractive power and arranged as a variator which is movable at the time of zooming, a third lens group having negative refractive power and arranged as a compensator which is movable at the time of zooming, and a fourth lens group arranged as a relay lens group. Besides, the fourth lens group comprises a front subgroup which comprises at least one negative lens component, and a rear subgroup which comprises one positive lens component or two positive lens components. To attain the afore-mentioned object of the present invention, the front subgroup in the fourth lens group is arranged to comprise two or three lens components and at least one of said lens components is formed as an aspherical lens.

The large aperture ratio zoom lens system accoridng to the present invention is an improvement of the zoom lens system according to the afore-mentioned invention by the same inventor (U.S. patent application No. 706,863). To improve the performance of the zoom lens system according to the afore-mentioned invention and, at the same time, to arrange that the overall length of the lens system becomes shorter and the number of lenses constituting the lens system is reduced, at least one of lens surfaces in the lens system may be arranged as an aspherical surface. However, to reduce the number of lenses constituting the lens system and, at the same time, to maintain the same level of overall length and performance of the lens system, it is important to know the effective way of selecting the surface to be arranged as an aspherical surface and lens component to be omitted. The third lens group comprises only one lens and, therefore, it is impossible to omit it. The second lens group comprises three lenses and, when consideration is given to correction of chromatic aberration when the zoom ratio is made large, it is impossible to make the number of lenses still smaller unless the zooming method is changed. If the number of lenses constituting the first lens group is reduced by one, it is necessary to make the powers of the other lenses stronger. Especially, in case of the first lens group, the lens diameters are large. Therefore, if the power of the positive lens is made strong, the lens thickness should be made very large in order to ensure the thickness of marginal portion, and this is not preferable. Therefore, it is difficult to reduce the number of lenses constituting the first lens group.

Due to the above-mentioned reasons, in the present invention, the number of lenses constituting the fourth lens group is reduced by one or two, and the problem of aggravation of aberrations to be caused by the fact that the powers of the remaining lenses are made stronger and problem of decrease in the degree of freedom for correction of aberrations are solved by adopting at least one aspherical surface so as to thereby obtain a zoom lens system which is also excellent in the same degree as the zoom lens system according to the afore-mentioned invention (U.S. patent application No. 706,863).

In case of this kind of zoom lens system, spherical aberration especially tends to become unfavourable when the number of lenses constituting the fourth lens group is reduced by one or two. If it is attempted to compulsively correct spherical aberration in such case, other aberrations such as coma, astigmatism and distortion become unfavourable. Therefore, it is effective when an aspherical surface which is effective for correction of spherical aberration is provided in the lens system.

In the zoom lens system according to the present invention, the surface on the object side of the negative lens component in the fourth lens group which has large influence on spherical aberration but does not have much influence on the other aberrations is arranged as an aspherical surface.

Besides, the effect to be attained by the use of an aspherical surface can be further increased by the selection of the shape of the aspherical surface to be adopted.

When, in FIG. 12, the surface B represents an aspherical surface and the surface A represents a reference spherical surface, it is preferable to adopt an aspherical surface which is formed so that the amount of deviation of the aspherical surface B from the reference spherical surface A in the direction of optical axis, i.e., the distance $\Delta x$ from the point P on the reference spherical surface A to the point P' on the aspherical surface B, fulfills the conditions (1) and (2) shown below:

$$|\Delta x| \leq 1.0 \times 10^{-4} \cdot f_{IV} \text{ (when } y=0.1f_{IV}) \quad (1)$$

$$0 < |\Delta x| \leq 1.6 \times 10^{-3} \cdot f_{IV} \text{ (when } y=0.2f_{IV}) \quad (2)$$

where, reference symbol y represents the height from the optical axis, and reference symbol $f_{IV}$ represents the focal length of the fourth lens group.

The condition (1) shown in the above means that, in a position where the height of the aspherical surface from the optical axis is $y=0.1f_{IV}$, i.e., in a position near the optical axis, it is preferable to make the amount of deviation of the aspherical surface from the reference spherical surface not so large. This is because, if the abount of deviation from the reference spherical surface is made large in said position, astigmatism is liable to become unfavourable and, even if spherical aberration to be caused by the paraxial ray of which the height of ray is the highest can be made small, spherical aberration to be caused by paraxial rays of which the heights of rays are lower than that tends to become large. The condition (2) defines the range of the amount of deviation of the aspherical surface from the reference spherical surface in a position where the height from the optical axis is $y=0.2f_{IV}$, i.e., in a position distance from the optical axis and near the position where the paraxial ray with the largest height of ray passes.

The degree of freedom for correction of spherical aberration in the portion near the marginal portion increases when the aspherical surface is deviated from the reference spherical surface to some extent. However, if the amount of the above-mentioned deviation from the reference spherical surface is made too large and the value defined by the condition (2) becomes larger than the upper limit thereof, zonal spherical aberration becomes large and, moreover, it is impossible to correct astigmatism favourably. In other words, correction of aberrations by other lenses become insufficient.

As described so far, the large aperture ratio zoom lens system according to the present invention is developed for the purpose of application to an electronic image pick-up device with high performance, i.e., with high resolving power. The zoom lens system provided by the present invention is a large aperture ratio zoom lens system which employs an aspherical surface and comprises a small number of lenses and, at the same time, which has a large zoom ratio and high performance. Reduction in the number of lenses constituting a lens system becomes more effective when the press technology for glass materials advances and it becomes possible to form aspherical lenses at low costs.

Besides, it is desirable to reduce the weight of the first lens group in which the lens diameters are large and which is heavy in weight. Especially when an automatic focusing method is adopted, reduction in the weight of the first lens group is important from the view points of power consumption and response speed. In the zoom lens system according to the present invention, at least one of the lenses constituting the first lens group may be arranged as a plastic mold lens. In that case, correction of aberrations becomes somewhat difficult because refractive indices of plastic lenses are generally lower compared with glass materials. However, when one of surfaces of the plastic lens is formed as an aspherical surface, it is possible to correct aberrations favourably. Besides, when a plastic lens is adopted, it is possible to reduce the cost in addition to reduction of weight.

To correct aberrations more favourably and to shorten the overall length of the lens system in case of the zoom lens system according to the present invention, it is preferable to arrange that said zoom lens system fulfills the conditions (3) and (4) shown below:

$$1.5f_{IV} < l < 2.2f_{IV} \quad (3)$$

$$0.14f_{IV} < D < 0.5f_{IV} \quad (4)$$

where, reference symbol l represents the distance from the rear principal point of the negative lens component which constitutes the front subgroup in the fourth lens group to the rear focal point of the zoom lens system as a whole, and reference symbol D represents the airspace between the front subgroup and rear subgroup in the fourth lens group.

When the value of l is made smaller than the lower limit of the condition (3), the radius of curvature of a surface of the negative lens component constituting the front subgroup in the fourth lens group becomes small, and spherical aberration, coma, etc. of higher orders are liable to occur even when an aspherical surface is adopted. On the contrary, when the value of l is made larger than the upper limit of the condition (3), the overall length of the lens system tends to become long, and this is not desirable.

When the value of D is made smaller than the lower limit of the condition (4), the above-mentioned aberrations of higher orders are liable to occur. When the value of D is made larger than the upper limit of the condition (4), the overall length of the lens system tends to become long, and these are not desirable.

DETAILED DESCRIPTION OF THE PREFERRED EMBODIMENTS

Figure 1:
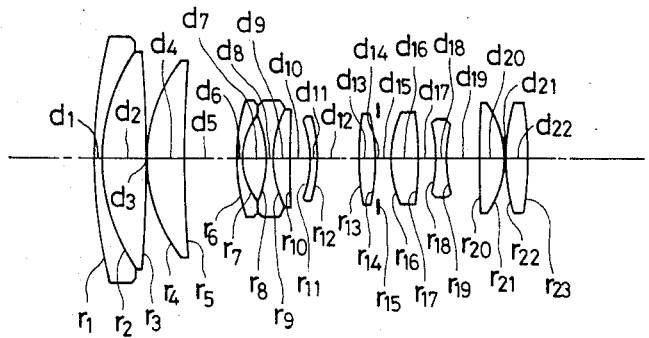
FIG. 1 shows a sectional view of Embodiments 1 and 2 of the large aperture ratio zoom lens system according to the present invention.
Figure 2:
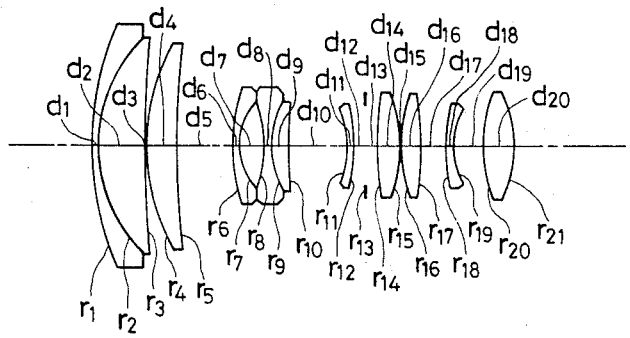
FIG. 2 shows a sectional view of Embodiment 3 of the large aperture ratio zoom lens system according to the present invention.

Now, preferred embodiments of the large aperture ratio zoom lens system according to the present invention have the lens configuration as shown in FIG. 1 or 2, and the numerical data thereof are as shown below.

---

Embodiment 1

$r_1 = 91.0802$
$d_1 = 1.1600 \quad n_1 = 1.80518 \quad \nu_1 = 25.43$
$r_2 = 30.2915$ -continued

Embodiment 1

| | | |
|---|---|---|
| $d_2 = 7.3000$ | $n_2 = 1.62012$ | $\nu_2 = 49.66$ |
| $r_3 = -258.6038$ | | |
| $d_3 = 0.1700$ | | |
| $r_4 = 30.2583$ | | |
| $d_4 = 5.6000$ | $n_3 = 1.62374$ | $\nu_3 = 47.10$ |
| $r_5 = 203.5944$ | | |
| $d_5 = 0.6005 \sim 9.324 \sim 15.617$ | | |
| $r_6 = 27.3251$ | | |
| $d_6 = 1.0400$ | $n_4 = 1.73400$ | $\nu_4 = 51.49$ |
| $r_7 = 11.8094$ | | |
| $d_7 = 3.9500$ | | |
| $r_8 = -23.1741$ | | |
| $d_8 = 1.0400$ | $n_5 = 1.69680$ | $\nu_5 = 55.52$ |
| $r_9 = 15.5878$ | | |
| $d_9 = 3.1000$ | $n_6 = 1.84666$ | $\nu_6 = 23.88$ |
| $r_{10} = 162.3555$ | | |
| $d_{10} = 12.2489 \sim 3.639 \sim 3.876$ | | |
| $r_{11} = -16.3682$ | | |
| $d_{11} = 1.0000$ | $n_7 = 1.69680$ | $\nu_7 = 55.52$ |
| $r_{12} = -27.6950$ | | |
| $d_{12} = 7.5084 \sim 7.393 \sim 0.856$ | | |
| $r_{13} = 110.1269$ | | |
| $d_{13} = 2.6726$ | $n_8 = 1.75700$ | $\nu_8 = 47.87$ |
| $r_{14} = -43.5026$ | | |
| $d_{14} = 0.6433$ | | |
| $r_{15} = \infty$ (stop) | | |
| $d_{15} = 2.0000$ | | |
| $r_{16} = 20.5138$ | | |
| $d_{16} = 4.9219$ | $n_9 = 1.69680$ | $\nu_9 = 55.52$ |
| $r_{17} = -106.5718$ | | |
| $d_{17} = 3.2576$ | | |
| $r_{18} = -23.2475$ (aspherical surface) | | |
| $d_{18} = 1.4025$ | $n_{10} = 1.84666$ | $\nu_{10} = 23.88$ |
| $r_{19} = 21.0405$ | | |
| $d_{19} = 6.0991$ | | |
| $r_{20} = 372.7992$ | | |
| $d_{20} = 3.9223$ | $n_{11} = 1.56873$ | $\nu_{11} = 63.16$ |
| $r_{21} = -15.7166$ | | |
| $d_{21} = 0.1342$ | | |
| $r_{22} = 26.3505$ | | |
| $d_{22} = 3.9299$ | $n_{12} = 1.56873$ | $\nu_{12} = 63.16$ |
| $r_{23} = -101.3900$ | | |
| $f = 14 \sim 42$ | F/2.0 | | coefficient of aspherical surface ($r_{18}$)
$B = 0$, $E = -0.19088 \times 10^{-4}$, $F = -0.51486 \times 10^{-7}$
$G = 0.33866 \times 10^{-9}$, $H = 0.5000 \times 10^{-13}$

Embodiment 2

| | | |
|---|---|---|
| $r_1 = 85.0712$ | | |
| $d_1 = 1.1600$ | $n_1 = 1.80518$ | $\nu_1 = 25.43$ |
| $r_2 = 29.7580$ | | |
| $d_2 = 8.0000$ | $n_2 = 1.62374$ | $\nu_2 = 47.10$ |
| $r_3 = -163.7286$ | | |
| $d_3 = 0.1700$ | | |
| $r_4 = 26.0710$ (aspherical surface) | | |
| $d_4 = 6.0000$ | $n_{14} = 1.49109$ | $\nu_3 = 57.00$ |
| $r_5 = 191.4729$ | | |
| $d_5 = 0.6002 \sim 8.872 \sim 14.853$ | | |
| $r_6 = 29.2330$ | | |
| $d_6 = 1.0400$ | $n_4 = 1.72916$ | $\nu_4 = 54.68$ |
| $r_7 = 11.6601$ | | |
| $d_7 = 3.9500$ | | |
| $r_8 = -20.4964$ | | |
| $d_8 = 1.0400$ | $n_5 = 1.69680$ | $\nu_5 = 55.52$ |
| $r_9 = 16.4230$ | | |
| $d_9 = 3.1000$ | $n_6 = 1.84666$ | $\nu_6 = 23.88$ |
| $r_{10} = 174.3451$ | | |
| $d_{10} = 12.7187 \sim 3.467 \sim 4.077$ | | |
| $r_{11} = -16.6009$ | | |
| $d_{11} = 1.0000$ | $n_7 = 1.69680$ | $\nu_7 = 55.52$ |
| $r_{12} = -25.4742$ | | |
| $d_{12} = 6.4669 \sim 7.446 \sim 0.856$ | | |
| $r_{13} = 104.7398$ | | |
| $d_{13} = 2.6726$ | $n_8 = 1.76200$ | $\nu_8 = 40.10$ |
| $r_{14} = -45.1397$ | | |
| $d_{14} = 0.6433$ | | |
| $r_{15} = \infty$ (stop) | | |
| $d_{15} = 2.0000$ | | |
| $r_{16} = 19.4140$ | | |
| $d_{16} = 4.6702$ | $n_9 = 1.69680$ | $\nu_9 = 55.52$ |
| $r_{17} = -61.1447$ | | |
| $d_{17} = 3.2247$ | | |
| $r_{18} = -19.2492$ (aspherical surface) | | |
| $d_{18} = 1.4025$ | $n_{10} = 1.84666$ | $\nu_{10} = 23.88$ |
| $r_{19} = 19.4429$ | | |
| $d_{19} = 5.8839$ | | |
| $r_{20} = 334.8746$ | | |
| $d_{20} = 3.9217$ | $n_{11} = 1.56873$ | $\nu_{11} = 63.16$ |
| $r_{21} = -15.6686$ | | |
| $d_{21} = 0.1342$ | | |
| $r_{22} = 29.9458$ | | |
| $d_{22} = 3.9010$ | $n_{12} = 1.56873$ | $\nu_{12} = 63.16$ |
| $r_{23} = -56.2051$ | | |
| $f = 14 \sim 42$ | F/2.0 | | coefficient of aspherical surface ($r_4$)
$B = 0$, $E = -0.20399 \times 10^{-6}$, $F = -0.26140 \times 10^{-9}$
$G = -0.49659 \times 10^{-12}$, $H = 0$
coefficient of aspherical surface ($r_{18}$)
$B = 0$, $E = -0.10649 \times 10^{-4}$, $F = 0.46490 \times 10^{-7}$
$G = 0.75166 \times 10^{-9}$, $H = 0.50000 \times 10^{-13}$

Embodiment 3

| | | |
|---|---|---|
| $r_1 = 50.8931$ | | |
| $d_1 = 1.1600$ | $n_1 = 1.80518$ | $\nu_1 = 25.43$ |
| $r_2 = 26.4712$ | | |
| $d_2 = 8.0000$ | $n_2 = 1.62012$ | $\nu_2 = 49.66$ |
| $r_3 = 224.5904$ | | |
| $d_3 = 0.1700$ | | |
| $r_4 = 35.7052$ | | |
| $d_4 = 5.6000$ | $n_3 = 1.62280$ | $\nu_3 = 57.06$ |
| $r_5 = 397.0655$ | | |
| $d_5 = 0.5936 \sim 9.007 \sim 16.202$ | | |
| $r_6 = 32.5210$ | | |
| $d_6 = 1.0400$ | $n_4 = 1.73400$ | $\nu_4 = 51.49$ |
| $r_7 = 11.5208$ | | |
| $d_7 = 4.5000$ | | |
| $r_8 = -19.2961$ | | |
| $d_8 = 1.0400$ | $n_5 = 1.69350$ | $\nu_5 = 50.81$ |
| $r_9 = 15.0067$ | | |
| $d_9 = 3.2000$ | $n_6 = 1.84666$ | $\nu_6 = 23.88$ |
| $r_{10} = 410.7138$ | | |
| $d_{10} = 20.1171 \sim 10.212 \sim 4.885$ | | |
| $r_{11} = -13.1594$ | | |
| $d_{11} = 1.0000$ | $n_7 = 1.70154$ | $\nu_7 = 41.21$ |
| $r_{12} = -23.7756$ | | |
| $d_{12} = 1.1800 \sim 1.987 \sim 0.859$ | | |
| $r_{13} = \infty$ (stop) | | |
| $d_{13} = 2.0000$ | | |
| $r_{14} = 59.3543$ (aspherical surface) | | |
| $d_{14} = 3.4701$ | $n_8 = 1.73400$ | $\nu_8 = 51.49$ |
| $r_{15} = -27.4634$ | | |
| $d_{15} = 0.7734$ | | |
| $r_{16} = 29.7635$ | | |
| $d_{16} = 3.0017$ | $n_9 = 1.56873$ | $\nu_9 = 63.16$ |
| $r_{17} = -50.4782$ | | |
| $d_{17} = 4.1000$ | | |
| $r_{18} = 50.4461$ (aspherical surface) | | |
| $d_{18} = 1.4029$ | $n_{10} = 1.84666$ | $\nu_{10} = 23.88$ |
| $r_{19} = 12.8741$ | | |
| $d_{19} = 5.3524$ | | |
| $r_{20} = 28.1332$ | | |
| $d_{20} = 5.2458$ | $n_{11} = 1.56873$ | $\nu_{11} = 63.16$ |
| $r_{21} = -19.9751$ | | |
| $f = 14 \sim 42$ | F/2.0 | | coefficient of aspherical surface ($r_{14}$)
$B = 0$, $E = -0.47194 \times 10^{-4}$, $F = 0.20828 \times 10^{-6}$
$G = -0.10733 \times 10^{-8}$, $H = -0.16497 \times 10^{-10}$
coefficient of aspherical surface ($r_{18}$)
$B = 0$, $E = 0.79803 \times 10^{-5}$, $F = 0.11435 \times 10^{-7}$
$G = 0.17049 \times 10^{-8}$, $H = 0.50561 \times 10^{-11}$ In the numerical data of respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses. The aspherical surfaces adopted in respective embodiments are expressed by the formula shown below where reference symbol r represents the radius of curvature of the reference spherical surface, reference symbol x represents the distance from an arbitrary point on the aspherical surface to the tangential plane which is tangential to the aspherical surface at the vertex thereof, and reference symbol y represents the distance from said arbitrary point to the optical axis.

$$x = \frac{y^2/r}{1 + \sqrt{1 - (y/r)^2}} + By^2 + Ey^4 + Fy^6 + Gy^8 + Hy^{10} + \ldots$$

The values of the coefficients of aspherical surface B, E, F, G, H, . . . are as shown in the numerical data of respective embodiments.

Figure 3:
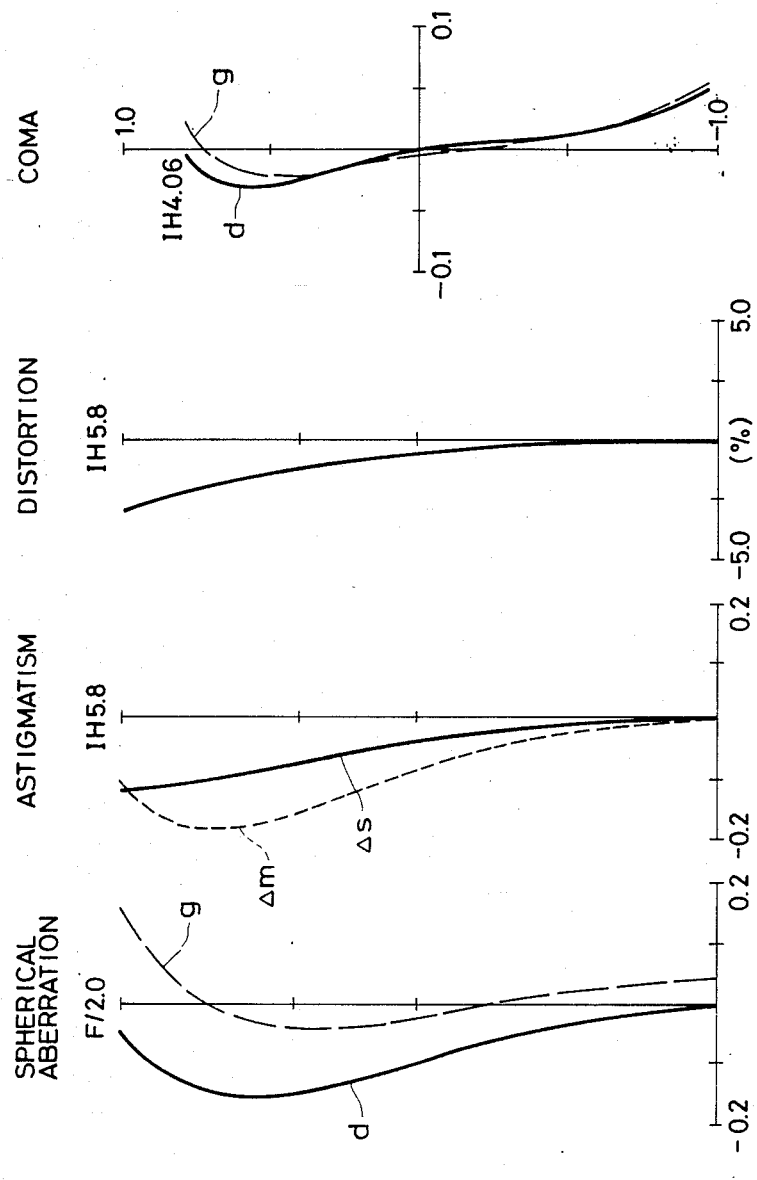
FIGS. 3 through 5 respectively show graphs illustrating aberration curves of Embodiment 1 of the present invention.
Figure 4:
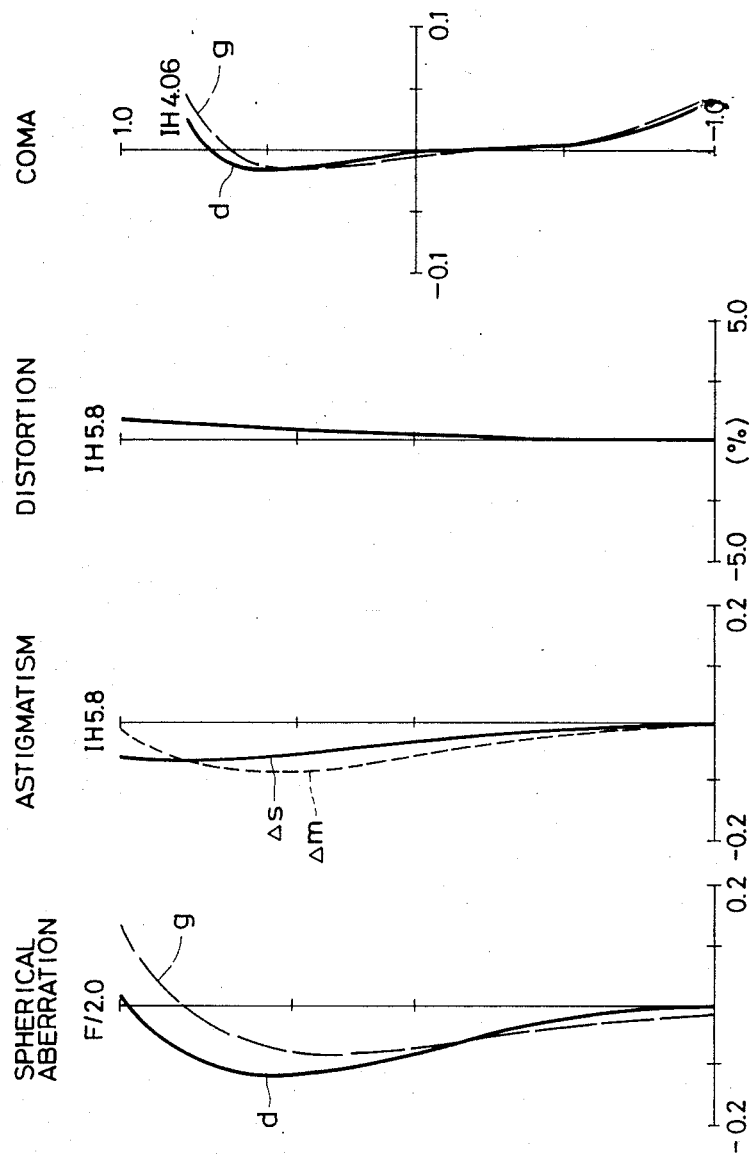
Figure 5:
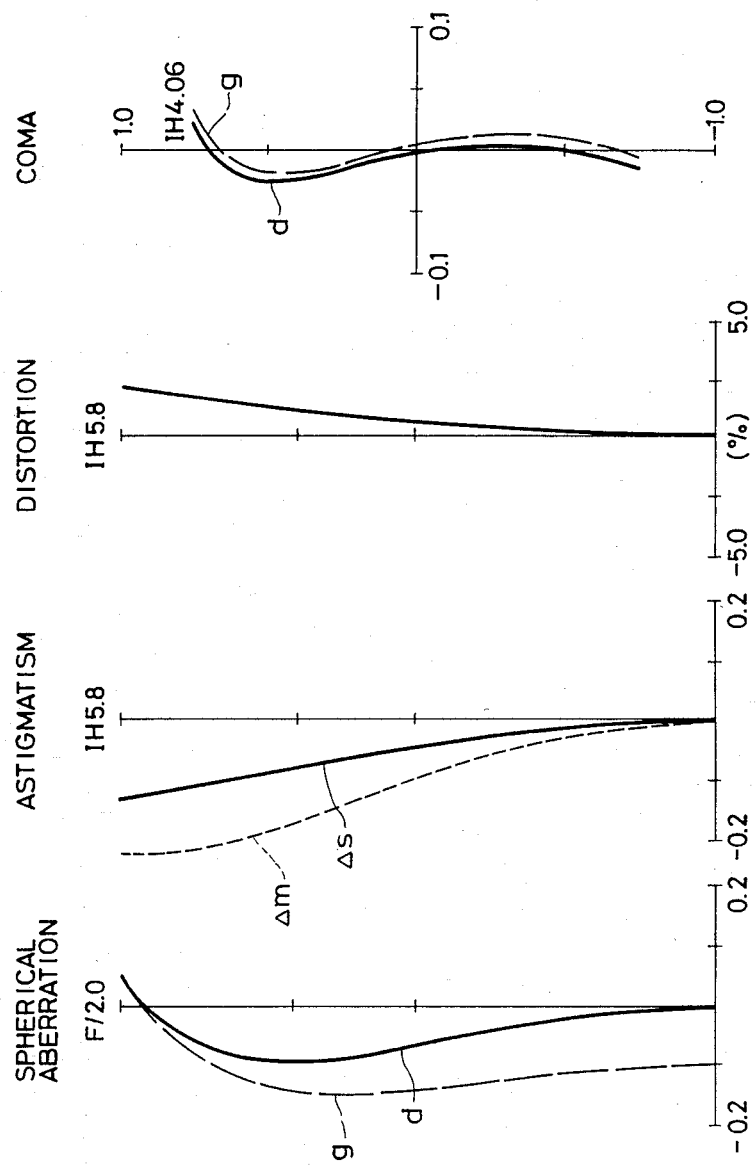

Out of respective embodiments shown in the above, Embodiment 1 has the lens configuration as shown in FIG. 1. That is, in Embodiment 1, the first lens group comprises a positive cemented doublet and a positive lens component, the second lens group comprises a negative lens component and a negative cemented doublet, the third lens group comprises a negative lens component, and the fourth lens group comprises a front subgroup, which comprises two positive lens components and a negative lens component, and a rear subgroup which comprises two positive lens components. Besides, the surface on the object side of the negative lens component constituting the front subgroup in the fourth lens group is arranged as an aspherical surface. Aberration curves of Embodiment 1 in the wide position, standard position and teleposition are as shown in FIGS. 3, 4 and 5 respectively.

Figure 6:
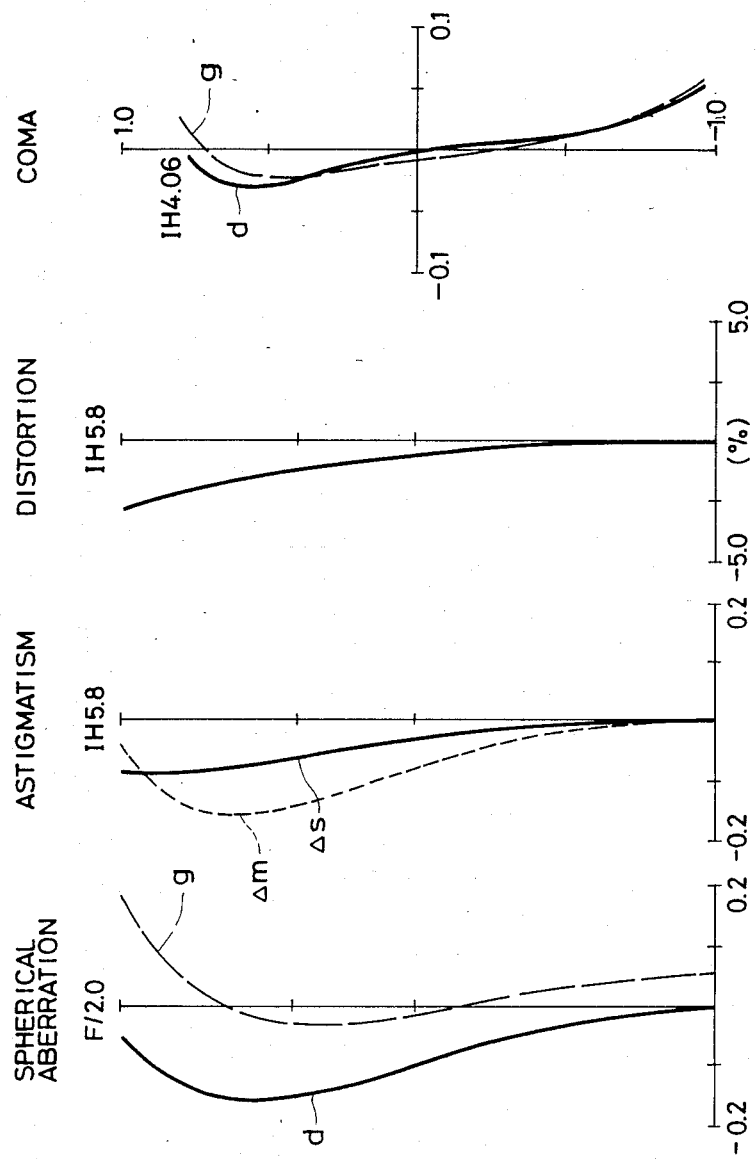
FIGS. 6 through 8 respectively show graphs illustrating aberration curves of Embodiment 2 of the present invention.
Figure 7:
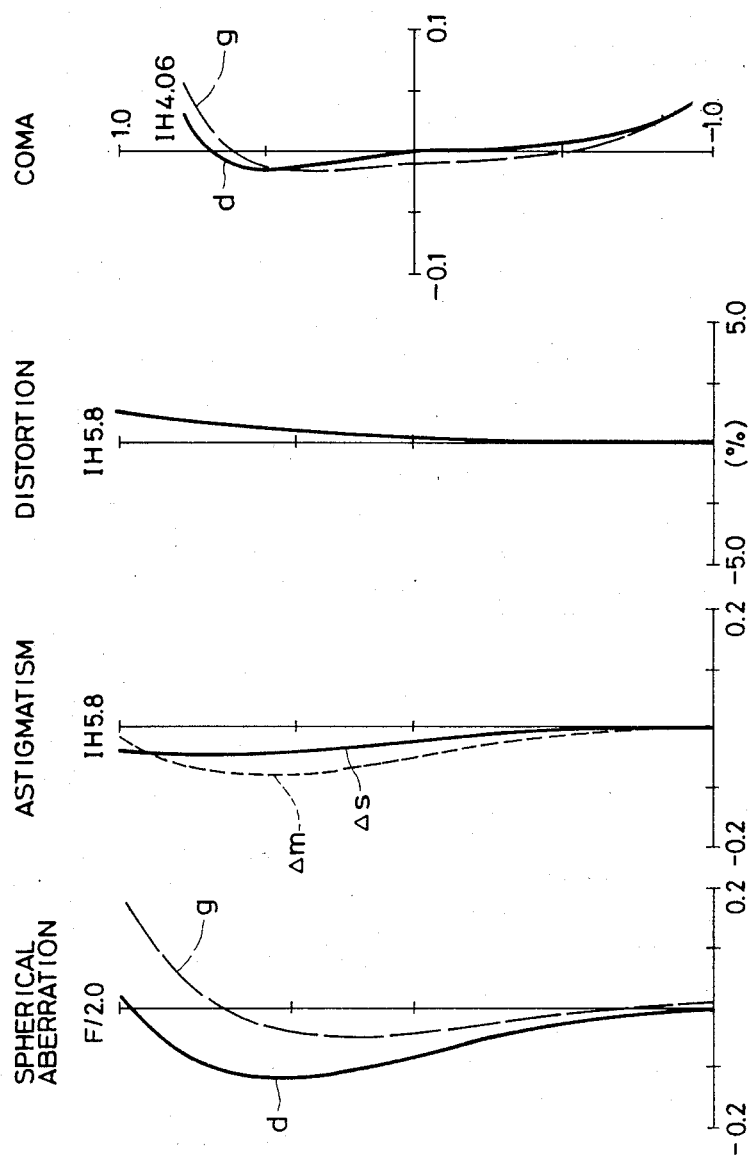
Figure 8:
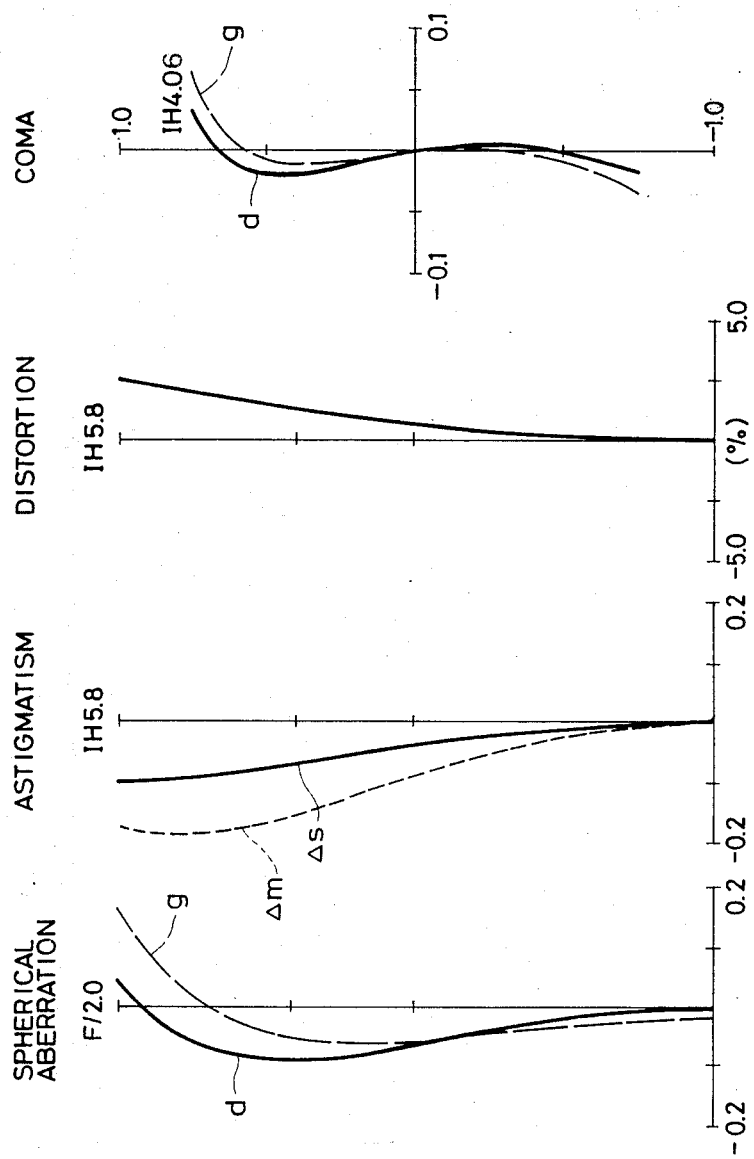

Embodiment 2 has the lens configuration as shown in FIG. 1 in the same way as Embodiment 1. However, in Embodiment 2, the positive lens component in the first lens group is arranged as a plastic lens, and aspherical surfaces are adopted for the surface on the object side of said plastic lens and for the surface on the object side of the negative lens component constituting the front subgroup in the fourth lens group. Aberration curves of Embodiment 2 in the wide position, standard position and teleposition are as shown in FIGS. 6, 7 and 8 respectively.

Figure 9:
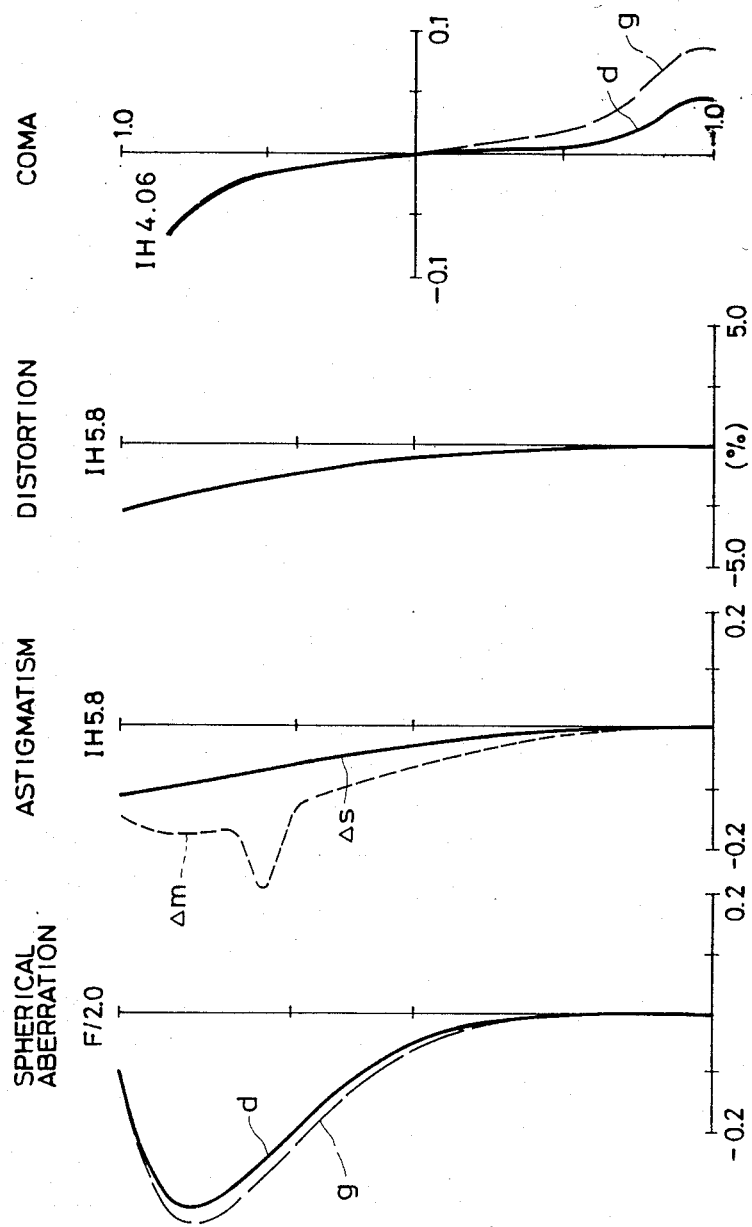
FIGS. 9 through 11 respectively show graphs illustrating aberration curves of Embodiment 3 of the present invention.
Figure 10:
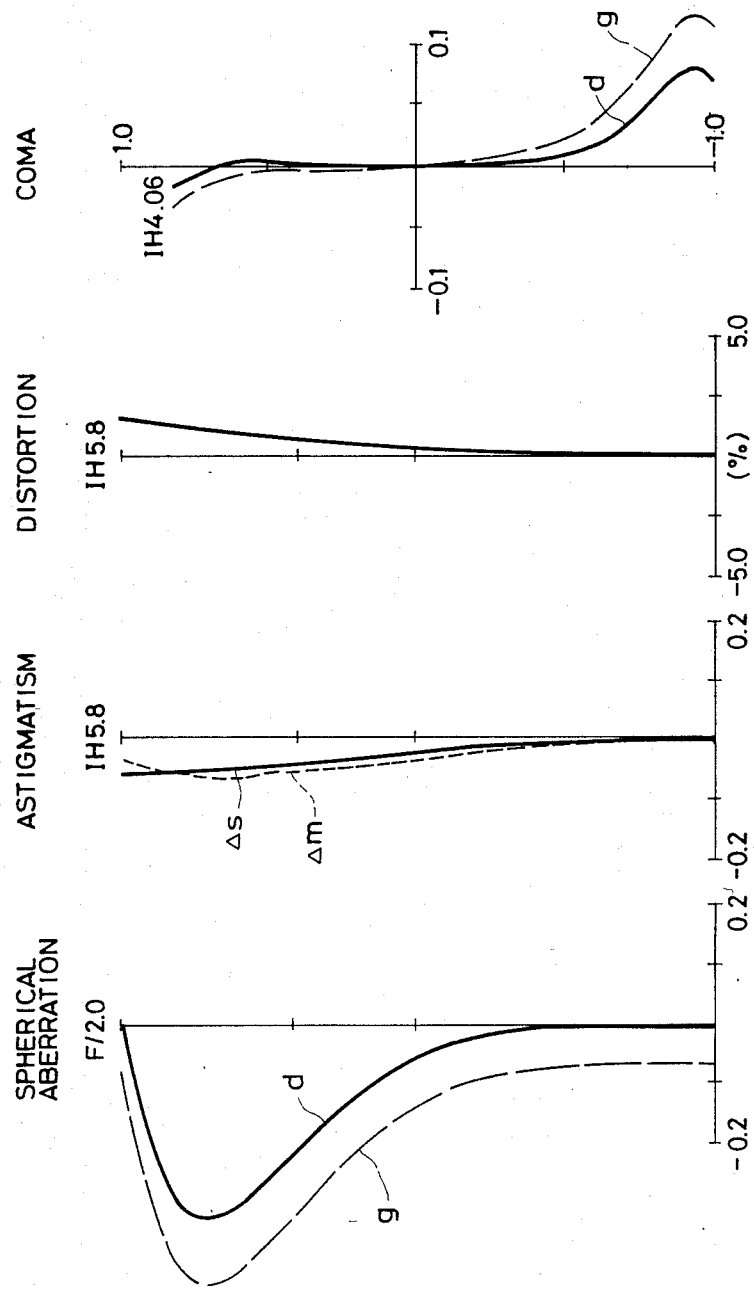
Figure 11:
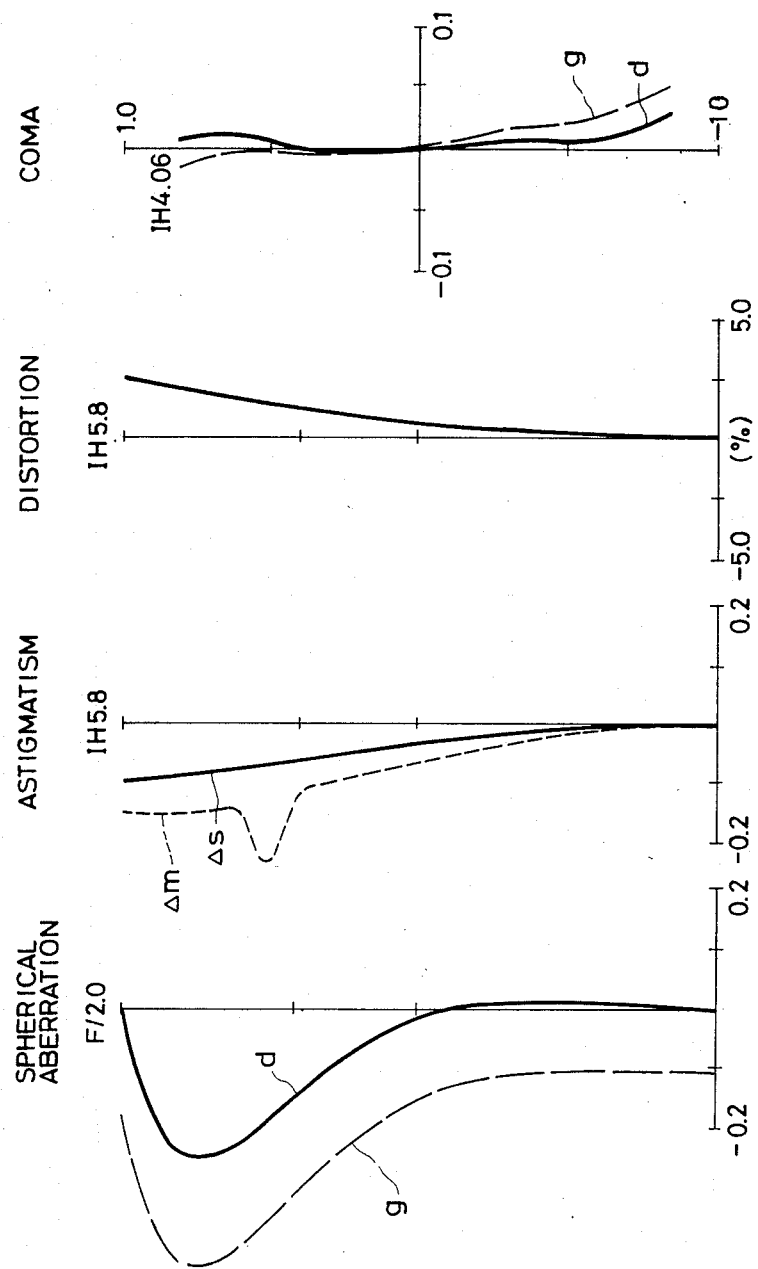
Figure 12:
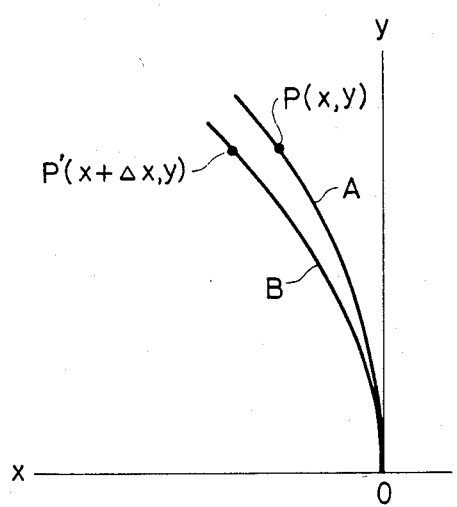
FIG. 12 shows a figure for explanation of the shape of the aspherical surface.

Embodiment 3 has the lens configuration as shown in FIG. 2. In Embodiment 3, the fourth lens group comprises a front subgroup, which comprises two positive lens components and a negative lens component, and a rear subgroup which comprises a positive lens component. Besides, the surface on the object side of the positive lens component, which is arranged on the object side in the front subgroup of the fourth lens group and the surface on the object side of the negative lens component constituting the front subgroup of the fourth lens group are arranged as aspherical surfaces. Aberration curves of Embodiment 3 in the wide position, standard position and teleposition are as shown in FIGS. 9, 10 and 11 respectively.

The present invention provides a large aperture ratio zoom lens system comprising four lens groups wherein the fourth lens group is arranged to comprise a small number of lenses, i.e., four or five lenses, by adopting at least one aspherical surface in said fourth lens group in spite of the fact that the fourth lens groups in the known zoom lens systems are arranged to comprise six or seven lenses, the zoom lens system according to the present invention being further arranged to have high performance in the same degree as the known zoom lens systems in the state that the overall length of the lens system is kept short and the back focal length is kept long. Therefore, when aspherical lenses of low costs appear due to advance in the press technology for aspherical lenses made of glass materials, it is possible to obtain a zoom lens system with high performance at a low cost and, when an electronic image pick-up device with high resolving power appears, the zoom lens system provided by the present invention becomes the most suitable zoom lens system for an electronic photographing camera which employs such electronic image pick-up device.

I claim:

1. A large aperture ratio zoom lens system comprising in order from the object side, a first lens group having positive refractive power, a second lens group having negative refractive power, a third lens unit having negative refractive power, and a fourth lens group consisting of a front subunit and a rear subunit wherein said front subunit consists of a positive lens element, a positive lens element and a negative lens element and said rear subunit consists of one positive lens element, said fourth lens group having at least one aspherical surface.

2. A large aperture ratio zoom lens system comprising in order from the object side, a first lens group having positive refractive power, a second lens group having negative refractive power, a third lens unit having negative refractive power, and a fourth lens group consisting of a front subunit and rear subunit wherein said front subunit consists of a positive lens element, a positive lens element and a negative lens element and said rear subunit consists of two positive lens elements, said fourth lens group having at least one aspherical surface.

3. A large aperture ratio zoom lens system according to claim 1 or 2 wherein the surface on the object side of the negative lens component in said front subunit is arranged as an aspherical surface.

4. A large aperture ratio zoom lens system according to claim 3 wherein said aspherical surface fulfills the conditions (1) and (2) shown below:

$$|\Delta x| \leq 1.0 \times 10^{-4} \cdot f_{IV} \text{ (when } y = 0.1 f_{IV}) \quad (1)$$

$$0 < |\Delta x| \leq 1.6 \times 10^{-3} \cdot f_{IV} \text{ (when } y = 0.2 f_{IV}) \quad (2)$$

where, reference symbol $f_{IV}$ represents the focal length of the fourth lens group, reference symbol y represents the height of the aspherical surface from the optical axis, and reference symbol $\Delta x$ represents the amount of deviation of the aspherical surface from the reference spherical surface in the direction of the optical axis.

5. A large aperture ratio zoom lens system according to claim 4 wherein said first lens group comprises a cemented doublet, which comprises a negative lens element and a positive lens element, and a positive lens component, and said positive lens component in said first lens group is arranged as a plastic lens having an aspherical surface.

6. A large aperture ratio zoom lens system according to claim 4 wherein said first lens group comprises a cemented doublet, which comprises a negative lens element and a positive lens element, and a positive lens component, said second lens group comprises a negative lens component and a cemented doublet which consists of a negative lens element and a positive lens element, said third lens group comprises a negative lens component, and said fourth lens group comprises a front subgroup and a rear subgroup wherein said front subgroup comprises a positive lens component, a positive lens component and a negative lens component, and said rear subgroup comprises a positive lens component and a positive lens component, and wherein the surface on the object side of said negative lens component constituting said front subgroup is arranged as an aspherical surface expressed by the formula shown below, said large aperture ratio zoom lens system being further arranged to have the following numerical data:

| | | | |
|---|---|---|---|
| $r_1 = 91.0802$ | | | |
| | $d_1 = 1.1600$ | $n_1 = 1.80518$ | $\nu_1 = 25.43$ |
| $r_2 = 30.2915$ | | | |
| | $d_2 = 7.3000$ | $n_2 = 1.62012$ | $\nu_2 = 49.66$ |
| $r_3 = -258.6038$ | | | |
| | $d_3 = 0.1700$ | | |
| $r_4 = 30.2583$ | | | |
| | $d_4 = 5.6000$ | $n_3 = 1.62374$ | $\nu_3 = 47.10$ |
| $r_5 = 203.5944$ | | | |
| | $d_5 = 0.6005 \sim 9.324 \sim 15.617$ | | |
| $r_6 = 27.3251$ | | | |
| | $d_6 = 1.0400$ | $n_4 = 1.73400$ | $\nu_4 = 51.49$ |
| $r_7 = 11.8094$ | | | |
| | $d_7 = 3.9500$ | | |
| $r_8 = -23.1741$ | | | |
| | $d_8 = 1.0400$ | $n_5 = 1.69680$ | $\nu_5 = 55.52$ |
| $r_9 = 15.5878$ | | | |
| | $d_9 = 3.1000$ | $n_6 = 1.84666$ | $\nu_6 = 23.88$ |
| $r_{10} = 162.3555$ | | | |
| | $d_{10} = 12.2489 \sim 3.639 \sim 3.876$ | | |
| $r_{11} = -16.3682$ | | | |
| | $d_{11} = 1.0000$ | $n_7 = 1.69680$ | $\nu_7 = 55.52$ |
| $r_{12} = -27.6950$ | | | |
| | $d_{12} = 7.5084 \sim 7.393 \sim 0.856$ | | |
| $r_{13} = 110.1269$ | | | |
| | $d_{13} = 2.6726$ | $n_8 = 1.75700$ | $\nu_8 = 47.87$ |
| $r_{14} = -43.5026$ | | | |
| | $d_{14} = \infty\ 0.6433$ | | |
| $r_{15} = \infty$ (stop) | | | |
| | $d_{15} = 2.0000$ | | |
| $r_{16} = 20.5138$ | | | |
| | $d_{16} = 4.9219$ | $n_9 = 1.69680$ | $\nu_9 = 55.52$ |
| $r_{17} = -106.5718$ | | | |
| | $d_{17} = 3.2576$ | | |
| $r_{18} = -23.2475$ (aspherical surface) | | | |
| | $d_{18} = 1.4025$ | $n_{10} = 1.84666$ | $\nu_{10} = 23.88$ |
| $r_{19} = 21.0405$ | | | |
| | $d_{19} = 6.0991$ | | |
| $r_{20} = 372.7992$ | | | |
| | $d_{20} = 3.9223$ | $n_{11} = 1.56873$ | $\nu_{11} = 63.16$ |
| $r_{21} = -15.7166$ | | | |
| | $d_{21} = 0.1342$ | | |
| $r_{22} = 26.3505$ | | | |
| | $d_{22} = 3.9299$ | $n_{12} = 1.56873$ | $\nu_{12} = 63.16$ |
| $r_{23} = -101.3900$ | | | |
| $f = 14 \sim 42$ F/2.0 | | | | coefficient of aspherical surface ($r_{18}$)
$B = 0, E = -0.19088 \times 10^{-4}, F = -0.51486 \times 10^{-7}$
$G = 0.33866 \times 10^{-9}, H = 0.5000 \times 10^{-13}$ $$x = \frac{y^2/r}{1 + \sqrt{1 - (y/r)^2}} + By^2 + Ey^4 + Fy^6 + Gy^8 + Hy^{10} + \ldots$$

where, reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{12}$ respectively represent refractive indices of respective lenses, reference symbols $\nu_1$ through $\nu_{12}$ respectively represent Abbe's numbers of respective lenses, reference symbol r represents the radius of curvature of the reference spherical surface for the aspherical surface, rererence symbol x represents the distance from an arbitrary point on the aspherical surface to the tangential plane which is tangential to the aspherical surface at the vertex thereof, reference symbol y represents the distance from said arbitrary point to the optical axis, and reference symbols B, E, F, G and H respectively represent the coefficients of aspherical surface.

7. A large aperture ratio zoom lens system according to claim 6 wherein said first lens group comprises a cemented doublet, which comprises a negative lens element and a positive lens element, and a positive lens component, said second lens group comprises a negative lens component and a cemented doublet, which comprises a negative lens element and a positive lens element, said third lens group comprises a negative lens component, and said fourth lens group comprises a front subgroup and a rear subgroup wherein said front subgroup comprises a positive lens component, a positive lens component and a negative lens component, and said rear subgroup comprises positive lens component and a positive lens component, said large aperture ratio zoom lens system being arranged that the surface on the object side of said positive lens component constituting said first lens group and the surface on the object side of said negative lens component constituting said front subgroup are respectively arranged as aspherical surfaces expressed by the formula shown below, said large aperture ratio zoom lens system being further arranged to have the following numerical data:

| | | | |
|---|---|---|---|
| $r_1 = 85.0712$ | | | |
| | $d_1 = 1.1600$ | $n_1 = 1.80518$ | $\nu_1 = 25.43$ |
| $r_2 = 29.7580$ | | | |
| | $d_2 = 8.0000$ | $n_2 = 1.62374$ | $\nu_2 = 47.10$ |
| $r_3 = -163.7286$ | | | |
| | $d_3 = 0.1700$ | | |
| $r_4 = 26.0710$ (aspherical surface) | | | |
| | $d_4 = 6.0000$ | $n_3 = 1.49109$ | $\nu_3 = 57.00$ |
| $r_5 = 191.4729$ | | | |
| | $d_5 = 0.6002 \sim 8.872 \sim 14.853$ | | |
| $r_6 = 29.2330$ | | | |
| | $d_6 = 1.0400$ | $n_4 = 1.72916$ | $\nu_4 = 54.68$ |
| $r_7 = 11.6601$ | | | |
| | $d_7 = 3.9500$ | | |
| $r_8 = -20.4964$ | | | |
| | $d_8 = 1.0400$ | $n_5 = 1.69680$ | $\nu_5 = 55.52$ |
| $r_9 = 16.4230$ | | | |
| | $d_9 = 3.1000$ | $n_6 = 1.84666$ | $\nu_6 = 23.88$ |
| $r_{10} = 174.3451$ | | | |
| | $d_{10} = 12.7187 \sim 3.467 \sim 4.077$ | | |
| $r_{11} = -16.6009$ | | | |
| | $d_{11} = 1.0000$ | $n_7 = 1.69680$ | $\nu_7 = 55.52$ |
| $r_{12} = -25.4742$ | | | |
| | $d_{12} = 6.4669 \sim 7.446 \sim 0.856$ | | |
| $r_{13} = 104.7398$ | | | |
| | $d_{13} = 2.6726$ | $n_8 = 1.76200$ | $\nu_8 = 40.10$ |
| $r_{14} = -45.1397$ | | | |
| | $d_{14} = 0.6433$ | | |
| $r_{15} = \infty$ (stop) | | | |
| | $d_{15} = 2.0000$ | | |
| $r_{16} = 19.4140$ | | | |
| | $d_{16} = 4.6702$ | $n_9 = 1.69680$ | $\nu_9 = 55.52$ |
| $r_{17} = -61.1447$ | | | |
| | $d_{17} = 3.2247$ | | |
| $r_{18} = -19.2492$ (aspherical surface) | | | |

-continued

|  |  |  |
|---|---|---|
| $r_{19} =$ 19.4429 | $d_{18} = 1.4025$ | $n_{10} = 1.84666$ $\nu_{10} = 23.88$ |
| $r_{20} =$ 334.8746 | $d_{19} = 5.8839$ | |
| $r_{21} =$ −15.6686 | $d_{20} = 3.9217$ | $n_{11} = 1.56873$ $\nu_{11} = 63.16$ |
| $r_{22} =$ 29.9458 | $d_{21} = 0.1342$ | |
| $r_{23} =$ −56.2051 | $d_{22} = 3.9010$ | $n_{12} = 1.56873$ $\nu_{12} = 63.16$ |
| $f = 14 \sim 42$ | F/2.0 | | coefficient of aspherical surface ($r_4$)
$B = 0, E = -0.20399 \times 10^{-6}, F = -0.26140 \times 10^{-9}$
$G = -0.49659 \times 10^{-12}, H = 0$
coefficient of aspherical surface ($r_{18}$)
$B = 0, E = -0.10649 \times 10^{-4}, F = 0.46490 \times 10^{-7}$
$G = 0.75166 \times 10^{-9}, H = 0.5000 \times 10^{-13}$ $$x = \frac{y^2/r}{1 + \sqrt{1 - (y/r)^2}} + By^2 + Ey^4 + Fy^6 + Gy^8 + Hy^{10} + \ldots$$

where, reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{12}$ respectively represent refractive indices of respective lenses, reference symbols $\nu_1$ through $\nu_{12}$ respectively represent Abbe's numbers of respective lenses, reference symbol r represents the radius of curvature of the reference spherical surface for the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols B, E, F, G and H respectively represent the coefficients of aspherical surface.

8. A large aperture ratio zoom lens system according to claim 4 wherein said first lens group comprises a cemented doublet, which consists of a negative lens element and a positive lens element, and a positive lens component, said second lens group comprises a negative lens component and a cemented doublet, which comprises a negative lens element and a positive lens element, said third lens group comprises a negative lens component, and said fourth lens group comprises a front subgroup and a rear subgroup wherein said front subgroup comprises a positive lens component, a positive lens component and a negative lens component, and said rear subgroup comprises a positive lens component, said large aperture ratio zoom lens system being arrqnged that the surface on the object side of said positive lens component, which is located on the object side in said front subgroup, and the surface on the object side of said negative lens component constituting said front subgroup are respectively arranged as aspherical surfaces expressed by the formula shown below, said large aperture ratio zoom lens system being further arranged to have the following numerical data:

|  |  |  |
|---|---|---|
| $r_1 =$ 50.8931 | $d_1 = 1.1600$ | $n_1 = 1.80518$ $\nu_1 = 25.43$ |
| $r_2 =$ 26.4712 | $d_2 = 8.0000$ | $n_2 = 1.62012$ $\nu_2 = 49.66$ |
| $r_3 =$ 224.5904 | $d_3 = 0.1700$ | |
| $r_4 =$ 35.7052 | $d_4 = 5.6000$ | $n_3 = 1.62280$ $\nu_3 = 57.06$ |
| $r_5 =$ 397.0655 | | |

-continued

|  |  |  |
|---|---|---|
| | $d_5 = 0.5936 \sim 9.007 \sim 16.202$ | |
| $r_6 =$ 32.5210 | $d_6 = 1.0400$ | $n_4 = 1.73400$ $\nu_4 = 51.49$ |
| $r_7 =$ 11.5208 | $d_7 = 4.5000$ | |
| $r_8 =$ −19.2961 | $d_8 = 1.0400$ | $n_5 = 1.69350$ $\nu_5 = 50.81$ |
| $r_9 =$ 15.0067 | $d_9 = 3.2000$ | $n_6 = 1.84666$ $\nu_6 = 23.88$ |
| $r_{10} =$ 410.7138 | $d_{10} = 20.1171 \sim 10.212 \sim 4.885$ | |
| $r_{11} =$ −13.1594 | $d_{11} = 1.0000$ | $n_7 = 1.70154$ $\nu_7 = 41.21$ |
| $r_{12} =$ −23.7756 | $d_{12} = 1.1800 \sim 1.987 \sim 0.859$ | |
| $r_{13} =$ ∞ (stop) | $d_{13} = 2.0000$ | |
| $r_{14} =$ 59.3543 (aspherical surface) | $d_{14} = 3.4701$ | $n_8 = 1.73400$ $\nu_8 = 51.49$ |
| $r_{15} =$ −27.4634 | $d_{15} = 0.7734$ | |
| $r_{16} =$ 29.7635 | $d_{16} = 3.0017$ | $n_9 = 1.56873$ $\nu_9 = 63.16$ |
| $r_{17} =$ −50.4782 | $d_{17} = 4.1000$ | |
| $r_{18} =$ 50.4461 (aspherical surface) | $d_{18} = 1.4029$ | $n_{10} = 1.84666$ $\nu_{10} = 23.88$ |
| $r_{19} =$ 12.8741 | $d_{19} = 5.3524$ | |
| $r_{20} =$ 28.1332 | $d_{20} = 5.2458$ | $n_{11} = 1.56873$ $\nu_{11} = 63.16$ |
| $r_{21} =$ −19.9751 | | |
| $f = 14 \sim 42$ | F/2.0 | | coefficient of aspherical surface ($r_{14}$)
$B = 0, E = -0.47194 \times 10^{-4}, F = 0.20828 \times 10^{-6}$
$G = -0.10733 \times 10^{-8}, H = -0.16497 \times 10^{-10}$
coefficient of aspherical surface ($r_{18}$)
$B = 0, E = 0.79803 \times 10^{-5}, F = 0.11435 \times 10^{-7}$
$G = 0.17049 \times 10^{-8}, H = 0.50561 \times 10^{-11}$ $$x = \frac{y^2/r}{1 + \sqrt{1 - (y/r)^2}} + By^2 + Ey^4 + Fy^6 + Gy^8 + Hy^{10} + \ldots$$

where, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's numbers of respective lenses, reference symbol r represents the radius of curvature of the reference spherical surface for the aspherical surface, reference symbol x represents the distance from an arbitrary point of the aspherical surface to the tangential plane which is tangential to the aspherical surface at the vertex thereof, reference symbol y represents the distance from said arbitrary point to the optical axis, and reference symbols B, E, F, G and H respectively represent the coefficients of aspherical surface.

9. A large aperture ratio zoom lens system according to claim 1 or 2 wherein said zoom lens system fulfills the conditions (3) and (4):

$$1.5f_{IV} < l < 2.2f_{IV} \quad (3)$$

$$0.14f_{IV} < D < 0.55f_{IV} \quad (4)$$

where, reference symbol l represents the distance from the rear principal point of the negative lens component which constitutes the front subunit in the fourth lens group to the rear focal point of the zoom lens system as a whole, and reference symbol D represents the airspace between the front subunit and rear subunit in the fourth lens group.

* * * * *